(12) United States Patent  
Howard et al.

(10) Patent No.: US 8,615,432 B2  
(45) Date of Patent: Dec. 24, 2013

(54) BACKGROUND PROCESS FOR PROVIDING TARGETED CONTENT WITHIN A THIRD-PARTY APPLICATION

(75) Inventors: James Alexander Howard, Mountain View, CA (US); William Bedford Turner, Campbell, CA (US); Christopher Blumenberg, San Francisco, CA (US); Richard Williamson, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 487 days.

(21) Appl. No.: 12/767,102

(22) Filed: Apr. 26, 2010

(65) Prior Publication Data

US 2011/0246296 A1    Oct. 6, 2011

Related U.S. Application Data

(60) Provisional application No. 61/320,649, filed on Apr. 2, 2010.

(51) Int. Cl.  
*G06Q 30/00*    (2012.01)

(52) U.S. Cl.  
USPC ...................................................... 705/14.53

(58) Field of Classification Search  
None  
See application file for complete search history.

(56) References Cited

U.S. PATENT DOCUMENTS

| | | |
|---|---|---|
| 7,200,627 B2 | 4/2007 | Stickler |
| 7,222,078 B2 | 5/2007 | Abelow |
| 7,379,063 B2 | 5/2008 | Hoff |
| 7,428,555 B2 | 9/2008 | Yan |
| 7,620,565 B2 | 11/2009 | Abelow |
| 7,978,182 B2 | 7/2011 | Ording et al. |
| 8,132,120 B2 | 3/2012 | Stallings et al. |
| 2001/0047365 A1 | 11/2001 | Yonaitis |
| 2004/0015608 A1 | 1/2004 | Ellis et al. |
| 2004/0225647 A1 | 11/2004 | Connelly et al. |
| 2005/0093891 A1 | 5/2005 | Cooper |
| 2005/0240475 A1 | 10/2005 | Margiloff et al. |

(Continued)

FOREIGN PATENT DOCUMENTS

WO        2007/052285        5/2007

OTHER PUBLICATIONS

International Search Report and Written Opinion mailed on May 9, 2011 for PCT/US2010/050207, filed Sep. 24, 2010, titled "Background Process for Providing Targeted Content Within a Third-Party Applciation," to Apple Inc.

(Continued)

*Primary Examiner* — Daniel Sorkowitz  
(74) *Attorney, Agent, or Firm* — Novak Druce Connolly Bove + Quigg LLP

(57) ABSTRACT

The present technology presents targeted content, such as a targeted application, within a primary application, in such a fashion that the targeted application is a separate process from the primary application. The targeted application is targeted to a specific user by compiling targeting data, generally describing aspects related to the user and information about the primary application for use by an application server, which processes the targeting data to determine suitable content. The present technology further achieves a balance between the need to protect a user's information and sharing some of this information with trusted sources for selecting targeted content to be displayed within a primary application by providing an operating system process to accept requests and compile targeting data for determined targeted content from the primary application without sharing the targeting data with the primary application.

23 Claims, 8 Drawing Sheets

(56) References Cited

U.S. PATENT DOCUMENTS

| | | |
|---|---|---|
| 2006/0017692 A1 | 1/2006 | Wehrenberg et al. |
| 2006/0074769 A1 | 4/2006 | Looney et al. |
| 2007/0229541 A1 | 10/2007 | Klassen et al. |
| 2007/0279387 A1 | 12/2007 | Pletikosa et al. |
| 2008/0004954 A1 | 1/2008 | Horvitz |
| 2008/0033997 A1 | 2/2008 | Banker |
| 2008/0065491 A1 | 3/2008 | Bakman |
| 2008/0140720 A1 | 6/2008 | Six et al. |
| 2008/0143749 A1 | 6/2008 | Weybrew et al. |
| 2008/0154738 A1 | 6/2008 | Jain et al. |
| 2008/0160956 A1 | 7/2008 | Jackson et al. |
| 2008/0208712 A1 | 8/2008 | Yerkes et al. |
| 2008/0254775 A1 | 10/2008 | Rohs |
| 2009/0037239 A1 | 2/2009 | Wong et al. |
| 2009/0125343 A1 | 5/2009 | Cradick et al. |
| 2009/0125376 A1 | 5/2009 | Sundaresan et al. |
| 2009/0171847 A2 | 7/2009 | Bhambri et al. |
| 2009/0171906 A1* | 7/2009 | Adams et al. ............ 707/3 |
| 2009/0207138 A1 | 8/2009 | Thorn |
| 2009/0248537 A1 | 10/2009 | Sarkeshik |
| 2009/0259941 A1 | 10/2009 | Kennedy, Jr. |
| 2009/0289956 A1 | 11/2009 | Douris et al. |
| 2009/0298480 A1 | 12/2009 | Khambete et al. |
| 2009/0324100 A1 | 12/2009 | Kletter et al. |
| 2010/0060664 A1 | 3/2010 | Kilpatrick et al. |
| 2010/0066643 A1 | 3/2010 | King et al. |
| 2010/0088591 A1 | 4/2010 | Ho et al. |
| 2010/0153831 A1* | 6/2010 | Beaton .................... 715/201 |
| 2010/0169790 A1 | 7/2010 | Vaughan et al. |
| 2010/0317332 A1 | 12/2010 | Bathiche et al. |
| 2010/0317371 A1 | 12/2010 | Westerinen et al. |
| 2011/0054834 A1 | 3/2011 | Partridge et al. |
| 2011/0087529 A1 | 4/2011 | Angell |
| 2011/0210922 A1 | 9/2011 | Griffin |
| 2012/0210259 A1 | 8/2012 | Bederson et al. |

OTHER PUBLICATIONS

H. Federrath, O. Berthold, M. Kohntopp and S. Kopsell, "Tamkappen Furs Internet," pp. 148-155.

Joris Claessens, Bart Preneel and Joos Vandewalle, "Solutions for Anonymous Communication on the Internet," Security Technology, 1999. Proceedings. IEEE 33rd Annual 1999 International Carnahan Conference on, Madrid, Spain, Oct. 5-7, 1999, pp. 298-303, IEEE, Piscataway, NJ, USA, Oct. 5, 1999.

Collberg, Christian et al., "A Taxonomy of Obfuscating Transformations", Technical Report #148, Department of Computer Science, University of Aukland, Jul. 1997.

Judd, Christopher M. et al., ""Web Packaging and Deployment"", Pro Eclipse JST: Plug-ins for J2EE Development, Ch. 14, Apress, Berkeley, CA pp. 241-261, Sep. 8, 2005, Ch. 14, pp. 241-261.

* cited by examiner

BACKGROUND PROCESS FOR PROVIDING TARGETED CONTENT WITHIN A THIRD-PARTY APPLICATION

CROSS REFERENCE TO RELATED APPLICATIONS

This application claims the benefit of U.S. Provisional Patent Application No. 61/320,649, entitled "BACKGROUND PROCESS FOR PROVIDING TARGETED CONTENT WITHIN A THIRD-PARTY APPLICATION", filed on Apr. 2, 2010, and which is hereby expressly incorporated herein by reference in its entirety.

FIELD

The following relates to presenting a first application within a second application and more specifically relates to a background service that beneficially assists in the selection of an appropriate first application for presentation within the second application.

BACKGROUND

Targeting content to individual users has become an area of great importance in consumer computing technologies. Both users and content developers are helping to build momentum for this type of content.

Generally, targeting content to an individual user requires a server that can learn at least some facts about the user or their preferences and interests. Often times this is accomplished using cookies stored on the user's machine that store and record small facts about a user's past usages of the computing device. However, in some instances those facts can include data mined from the computing device itself and include information of a personal nature, such as a user's global positioning system location, home country and zip code, phone number area code, mobile carrier code, mobile country code, parental controls, etc.

Access to users' information is an extremely sensitive subject, and for obvious reasons, operating system developers protect this information from third-party software developers. However, the need and desire for more personalized content is putting pressure on operating system developers to provide access to the sensitive information stored on these devices.

SUMMARY

Accordingly, the present technology achieves a balance between the need to protect a user's information and sharing some of this information with trusted sources for selected targeted content. The present technology further presents targeted content, such as a targeted application, within a primary application, in such a fashion that the targeted application is a separate process from the primary application.

The present technology presents a primary application having a reserved view or window within which targeted content can be displayed. The primary application can be any application for any purpose, however, in many embodiments of the technology the primary application is a third-party application.

Being a third-party application, the primary application is restricted from accessing data that is typically known only to the operating system and device components. Such data can include personal information, location information, preference information and other data that can be considered sensitive.

However, this data can be especially valuable in determining which content is most suitable for a specific user. Content can be considered suitable because it is both appropriate for the user's viewing, and because it includes content that is likely to be interesting to that specific user. Some examples include sending content related to the outdoors to a user interested in outdoors activities, or sending content related to arts and crafts to an artist, etc.

In many cases, the developer of the primary application desires to have targeted content presented within the primary application in order to enrich the experience of the user or to present advertising. However, most third-party developers do not have the means to determine which content is most suitable for presentation.

Accordingly, the primary application can request a targeted application from the operating system, or a service sufficiently trusted by the operating system, that has access to data that can be useful in determining suitable content. Such data can be compiled as targeting data, and sent to a trusted service specialized in determining the most suitable content to be presented within the primary application. Importantly, while the targeting data can describe a user's preferences, previous search terms, interests, location, etc., no information that can relate this targeting data to the identity of the user is recorded or shared. The targeting data can also include less personal information, such as information about the primary application or type of device which has requested the targeted application.

The service, hereinafter referred to as an application server, can process the received targeting data and determine the most suitable targeted application, selected from targeted applications available to or known by the application server, and send the targeted application to the requesting device.

The requesting device can be directed to download the targeted application sent from the server and can present the targeted application within the view of the primary application that is reserved for targeted applications.

In some embodiments of the technology, the targeted application can be an HTML application, such as an HTML5 application, video, game, puzzle, advertisement, image or any other suitable application.

In some embodiments of the technology, a banner looking like the targeted application can be initially downloaded and presented in place of the targeted application while the targeted application completes downloading. This can be desirable to quickly fill in the view reserved for the targeted application while the application completes downloading.

DESCRIPTION

The technology described herein relates to presenting a targeted application within a primary application whereby the targeted application can be identified using a background process to access sensitive data that must be treated with due care appropriate to its sensitive nature.

The background process works as a daemon to respond to requests for a targeted application from the primary application. The daemon can have access to sensitive information that should not be shared with third-party applications and using the sensitive data, it can determine which targeted application should be returned to the primary application.

Such sensitive data can be application-targeting data, which can be used to deliver content that is targeted to a user of a device. The application-targeting data can include information about the device or about the user. For example, application-targeting data can include information identifying: the type of the device, applications loaded or running on the device, preferences, frequently viewed websites, frequently used applications, global positioning system data (GPS data), the operating system, etc. Due to the sensitive nature of much of this data, it is important that this data not be shared with third-party developers who could misuse the data or whose applications might be more vulnerable to hacking than an operating system. It is important to note, that while the operating system has access to this data, most operating system developers take great care to divorce these characteristics from the user itself to keep the individual user as anonymous as possible. It is a preferred aspect of the present technology that the identity of the user remains anonymous while still accessing enough data to provide properly targeted material.

Figure 1:
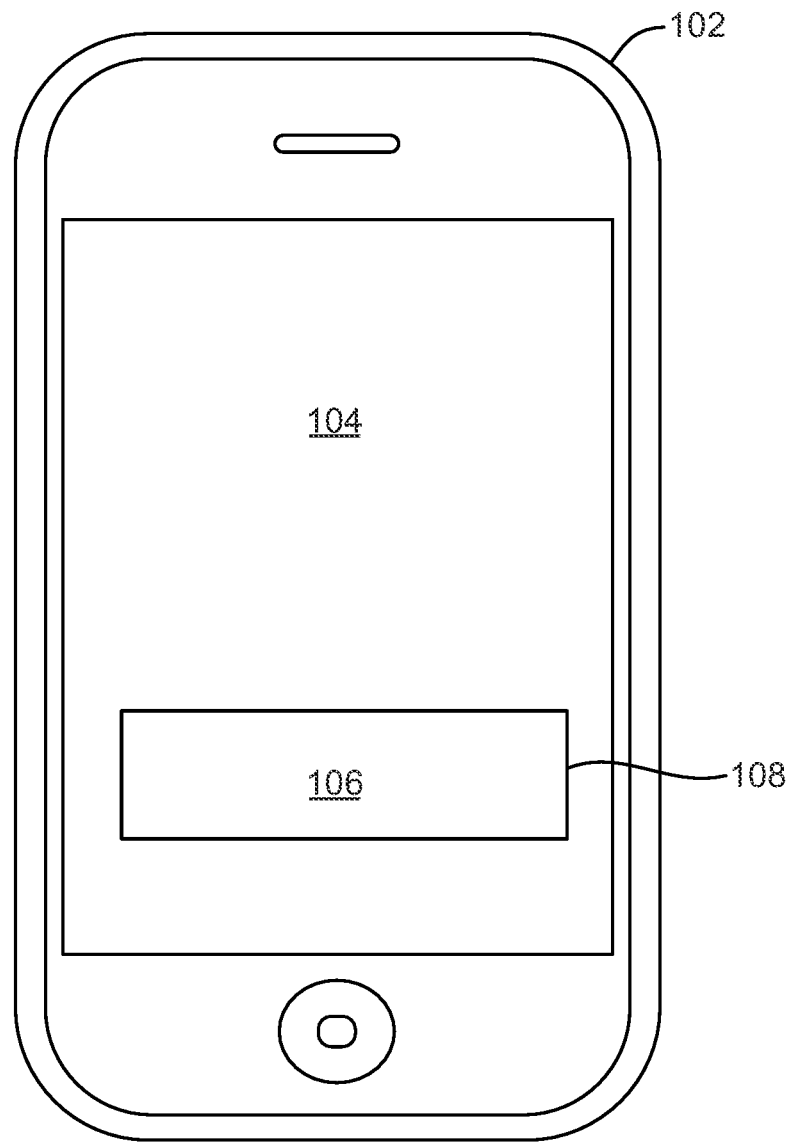
FIG. 1 illustrates an exemplary display presenting a targeted application within a primary application.

FIG. 1 illustrates an exemplary device 102 displaying a primary application 104 and a targeted application 106 in a view 108 within the primary application 104. As illustrated, the device 102 is a handheld computing device, for example, a smart phone, e.g., an IPHONE, by Apple Inc. of Cupertino, Calif. However, the device 102 can be any computing device such as a personal computer, laptop, or personal media-playing device; even a household appliance having a processor and a display can be used with the present technology.

The primary application 104 can be any application that reserves a view 108 or a window or a frame to display a second application 106. In some embodiments, the view has a standard dimension that is consistent across all potential primary applications. In some embodiments, the view 108 occupies about ten percent of the available screen area. Of course, the targeted application can occupy any desired portion of the primary application. However, the area of the targeted application should not be so large as to obscure or detract from the primary application, yet the targeted application should be large enough to view and interact with. Accordingly, the targeted application could be between one and sixty percent of the available screen area.

The targeted application 106 can be any application having content that is created with an audience in mind and can be targeted to that audience. For example, the application can be a game for children; a web application targeted at sports fans; or an advertisement for home improvement products targeted at home owners. In some preferred embodiments, the targeted application 106 can have some relationship to the primary application 104, such as a similarity in the target demographic for the audiences of both applications or in the nature of the content of the applications, etc.

Figure 2:
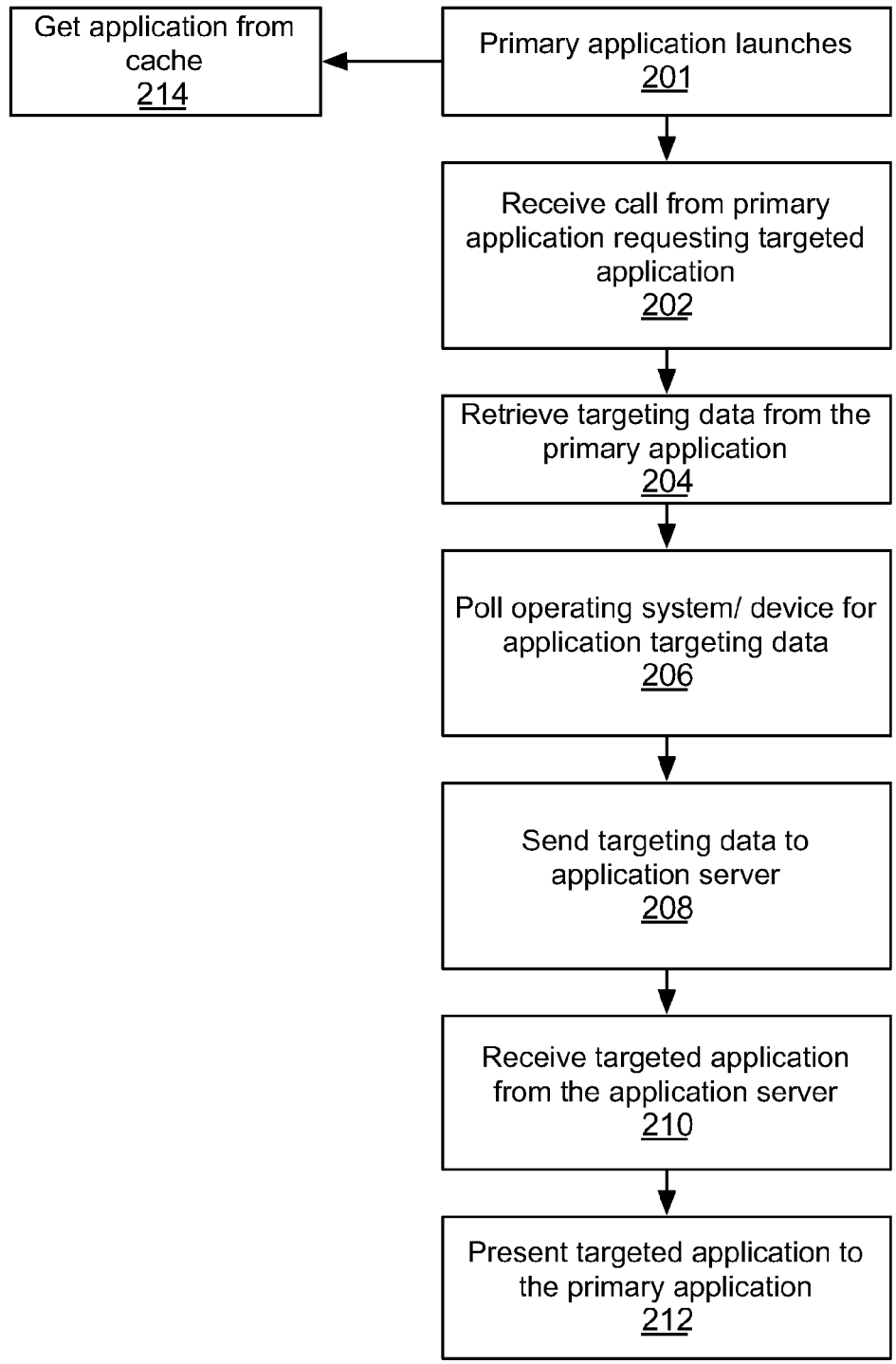
FIG. 2 is a flowchart illustrating a method embodiment for receiving a targeted application based on targeting data.

FIG. 2 illustrates an exemplary method embodiment for providing the targeted application for presentation within the primary application. When the primary application launches, it requests a targeted application for display in the view reserved for the targeted application and the request is received by a background process (202), a daemon.

The daemon has access to and collects various information to be used in determining which targeted application to provide to the primary application. This information, called targeting data, is collected from the application and the operating system.

The daemon receives some targeting data directly from the primary application (204). For example the primary application requests a targeted application that can fit reserved views of specified dimensions and/or number of views. The primary application can also request applications that meet other specifications, e.g., specifications such as content type (sports applications, retail applications, educational applications, etc.), target demographic information, etc. In some embodiments these specifications can be sent by the primary application as part of the request for a targeted application while in some embodiments these specifications can be sent in a separate communication.

Additionally, the daemon polls the operating system for additional targeting data (206). Since the daemon is a background process that is part of the operating system, it has access to a variety of targeting data that can be used to determine the optimum content to display to a user. This data can include user preferences, such as configuration preferences; it can also include data identifying specific applications installed or running on the device, or more general information about the applications identifying applications by broad category; it can include information identifying the primary application requesting the targeted application; it can include past internet search terms, topics extracted from electronic communications; it can include network information such as network state, roaming information, type of connection such as 3-G, 2-G, wi-fi, connection speeds, etc., and carrier information; it can include general user information such as country of residence, home zip code, phone number area code, language preferences, keyboard configuration, and parental restrictions; it can include device information such as screen dimensions, screen resolution, hardware capabilities, a device ID, etc.; it can include data extracted from a social network profile, for example what groups or applications the user is a member of, etc., or from an online store profile; and it can include other targeting data. The daemon can also have access to various hardware components of the device and can access targeting data such as GPS locations. In short, since the daemon is part of the operating system, it is deemed trusted enough to learn targeting data, some of which can be considered sensitive information, for the limited use of determining the optimum targeted content. While some examples of targeting data are listed above, they should not be considered limiting, but rather exemplary for the purposes of providing a fuller explanation of the present technology.

User protection and privacy is a primary concern, and one of the many benefits of the present technology is the protection of the user's sensitive information while gaining the benefit of using the data to determine the optimum content to display to a specific user. Among other protections provided by the present technology, the daemon can be trusted to not share any identifying information. The user's identity is separate from the targeting data used in selecting the targeted applications and not shared, thus keeping the user associated with the targeting data anonymous.

As introduced above, the daemon can learn of the primary application's identity from the operating system. While the primary application can send this information directly to the daemon in its request for a targeted application, in some environments, it is more desirable for the daemon to positively identify the application from the operating system itself. For example, in a system wherein all applications on the device originated from an associated store, the daemon can positively identify the application because the application comes from the store and is therefore highly likely to be correctly identified. Some stores cryptographically sign each application and include a unique key to identify the application. Every message sent by one application to another application on the device must identify itself with this key. In such systems each application can know with confidence that the calling application is as it appears, which makes the device more secure. Additionally, because the store is the source of the application, the store will often have more detailed information regarding the application and this data is not subject to manipulation by the software developer. Correctly identifying the application enables the application server to provide better targeted applications, to avoid presenting another ad for this same application to the user, and to track payments to the developer of the application.

The targeting data can be sent to an application server (208) to determine which targeted application should be presented to the user. The daemon can communicate with the application server using any suitable protocol, but in some embodiments, the daemon and the application server communicate via https. The application server can process the received targeting data using algorithms engineered for the purpose of selecting the targeted application. Importantly, the application server never learns the identity of the user, although it will use information about the user in determining the content to deliver to the user.

Once the application server determines which content to deliver to the user, it can send the content to the device and the daemon thereon. The daemon receives metadata describing the targeted application (210) and forwards the metadata to the primary application. The primary application then downloads the targeted application specified by the metadata and by storing the targeted application in a cache specific to the primary application. The primary application can then present a targeted application stored in its cache in the view field within the primary application (212).

Operating in this manner, the primary application can always present a targeted application that is already stored in its cache without calling the daemon. As illustrated in FIG. 2, when the primary application is launched (201) it can immediately display one of the targeted applications stored in its cache (214). If there are multiple targeted applications stored in the cache, the targeted application can present them in a round-robin fashion.

However, it is not desirable to allow the primary application to only retrieve a targeted application once and then always display it from the cache. Targeted applications can have limited life spans, or restrictions on the number of times the application can be presented. Such restrictions may be tied to the life of the targeted application or to only one session of the primary application. When the primary application requires a new targeted application it will request the targeted application from the daemon (204) as described above.

In some embodiments the application server can determine that multiple targeted applications should be sent to the device. In such embodiments, the first targeted application that is downloaded will be the first targeted application presented in the primary application.

In summary, the daemon functions as a proxy for the application server. The daemon receives requests for targeted applications and forwards targeted applications to the primary application. However, because the daemon is a process of the operating system it is also ideally suited to mine data that is needed by the application server to select the best targeted content for presentation in the primary application.

In addition to the proxy-like functions already described, in some embodiments the daemon can have additional proxy-like attributes. In such embodiments, targeted applications can be stored in a device-wide cache. The daemon can be configured to have limited logic, usually reserved for the application server, to select a targeted application from the pool of targeted applications stored in the device-wide cache. The targeted applications in a device-wide cache would include all applications downloaded from the application server over a certain period irrespective of which primary application for which the targeted applications were originally intended.

Figure 3:
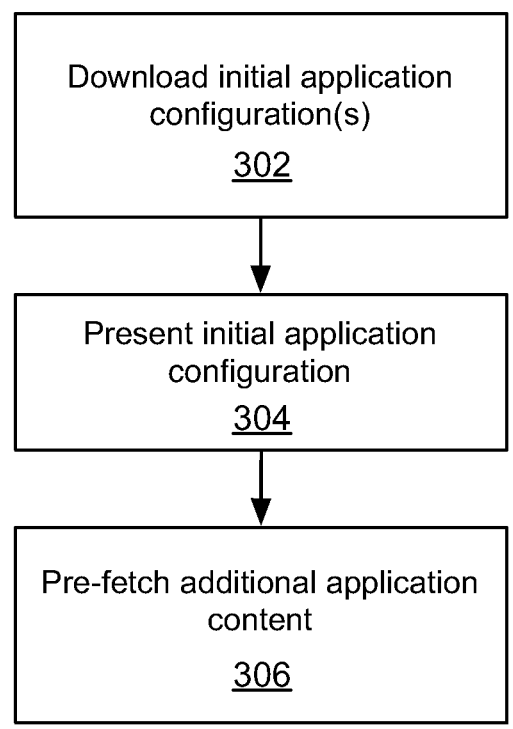
FIG. 3 is a flowchart illustrating a method embodiment for downloading the targeted application and initial views thereof.

FIG. 3 illustrates a process for downloading the full content of the targeted application that balances the competing interests of immediately displaying content so that the reserved view is not left blank with presenting a fully operational and interactive application. Initially, a static view of the targeted application is downloaded (302) and displayed (304).

In some embodiments, the targeted application can have more than one basic application configuration. Multiple basic configurations can be used, for example, in situations where the primary application can be presented in multiple presentation formats, e.g., landscape or portrait views corresponding to the availability of landscape and portrait orientations of the device display. In such embodiments, one or both of the basic application configurations can be initially downloaded (302).

After the initial application configuration has been downloaded it is displayed within the primary application (304). Initially, the targeted application displays as a static banner, the rest of the application content has been optimistically pre-fetched (306) the targeted application is available for full interaction.

While only a small portion of the targeted application is displayed, it can be interactive and full of rich content. The additional content can be pre-fetched so that the targeted application can present a functional user interface immediately upon being selected and then download additional resources as the user requests them by interacting with the application.

This method of downloading the targeted application overcomes some of the drawbacks related to serving the targeted application from a remote server. By initially downloading the initial application configurations, content is quickly made available for display on the device. This minimizes the possibility that the targeted-application view will be left blank while the full content is downloaded. The full content of the application is further downloaded and cached so that future interaction with the application will not be delayed by additional downloading operations. The application is optimistically downloaded so that all of the content is available immediately.

Figure 4:
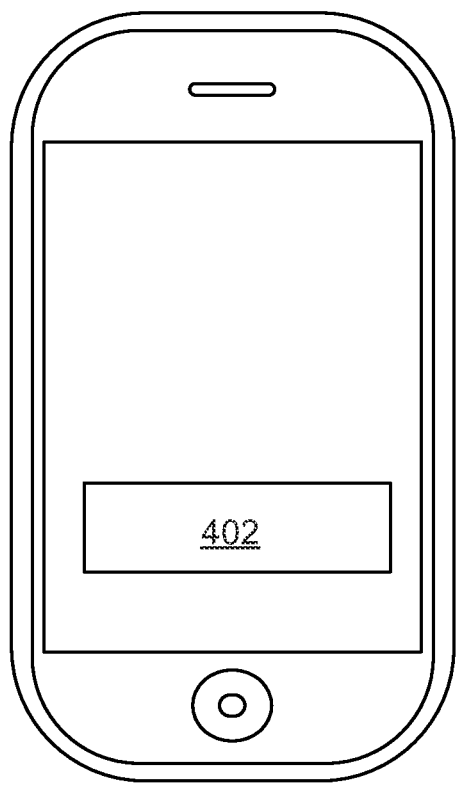
FIG. 4 illustrates multiple views of the targeted application corresponding to portrait and landscape display orientations.
Figure 4:
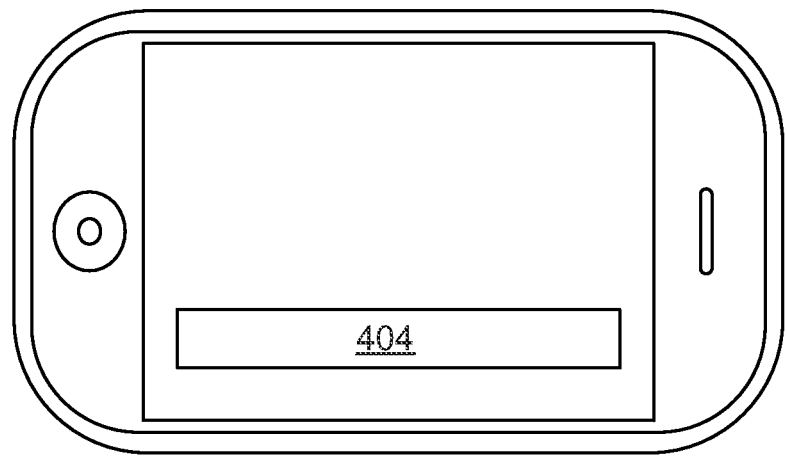

As mentioned above, multiple application configurations can be downloaded if the device has multiple possible presentation formats, such as portrait and landscape. In such aspects, it is anticipated that a view in portrait will not be as desirable in landscape. In some embodiments, it is desired that the targeted-application view and corresponding targeted-application configuration occupy only about ten percent of the display. As illustrated in FIG. 4, the targeted-application view in the portrait view (402) is fatter but thinner than the targeted-application view in the landscape view (404). Both views take up only about ten percent of the available screen area.

When the device is in a first orientation, for example a portrait orientation, and then rotates to a second orientation, for example a landscape orientation, the targeted-application view can resize along with the rest of the primary application, and the targeted-application configuration for that orientation can be displayed. When the device is rotated into a different orientation, the primary application will react to the change in orientation by rotating its view and resizing itself according to the new orientation. Along with this process, the primary application can present an alternate configuration for the targeted application that corresponds to the current orientation of the device which was downloaded along with the targeted application. In other words, a primary application that can be displayed in both landscape and portrait orientations will download a targeted application that can fit both orientations. When the device is rotated, the targeted application changes shape and animates to show content appropriate to the new aspect ratio. The content is still the same targeted application; it just has a slightly different representation for the new aspect ratio.

Figure 5:
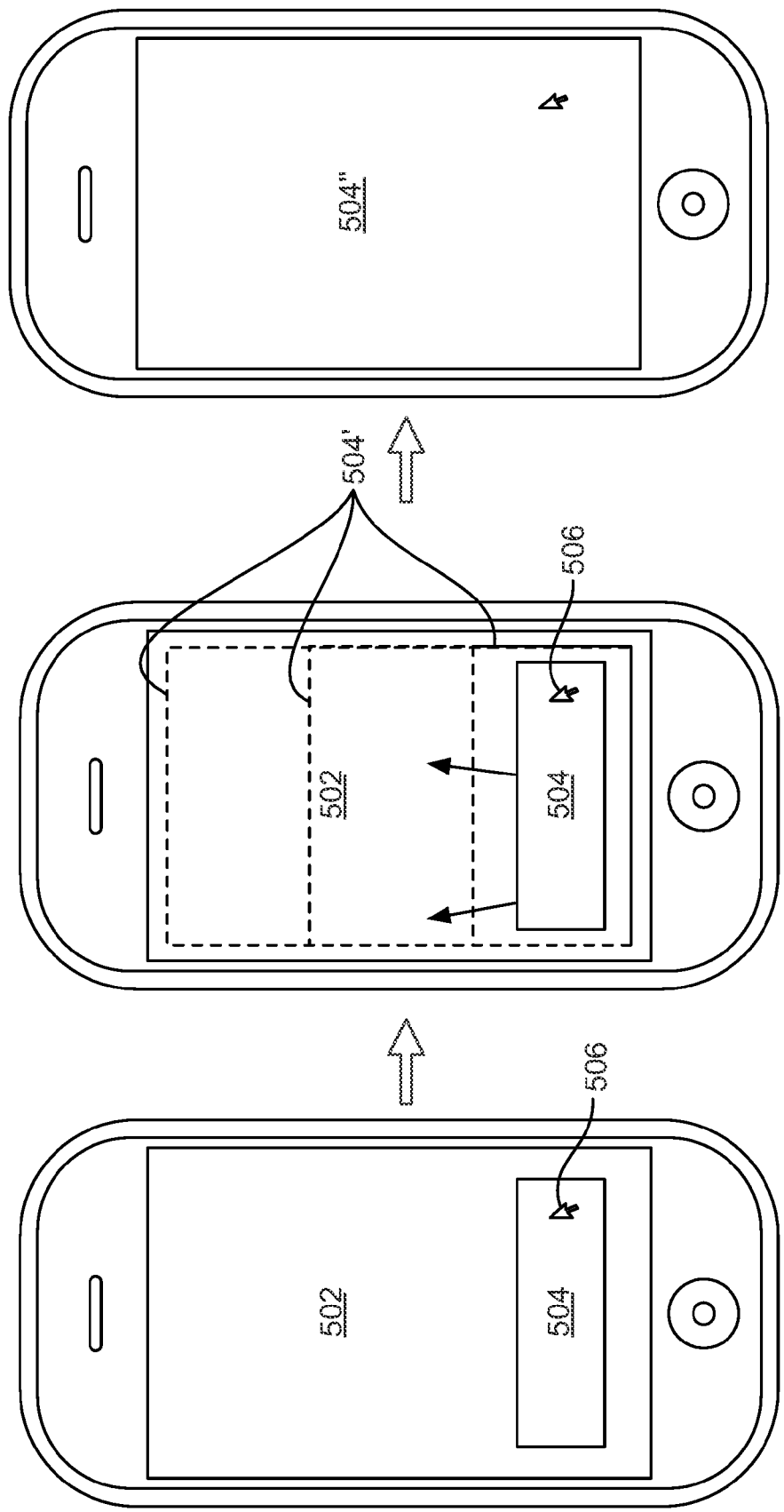
FIG. 5 illustrates a banner image for the targeted application that is a portion of the full screen view of the targeted application and a transition from the banner to the full screen view.

Except while the targeted application is being downloaded, the targeted application can be interactive. As illustrated in FIG. 5, the targeted application (504) can be selected using a pointing device (506). In the illustrated embodiment, the device has a touch screen input and thus a finger touch is illustrated, although any other selection mechanism is acceptable. Upon selection, the targeted application expands (504') to reveal its full view. In some embodiments, such as the embodiment illustrated in FIG. 5, the targeted application can be shown in a reduced view or a full view. At the left of FIG. 5, the targeted application is shown in a reduced view (504), while at the far right the full view (504") is illustrated. Upon selecting the reduced view (504), the targeted application morphs into its full view. The morphing is illustrated in the middle of FIG. 5 with 504' illustrating the transition between the reduced view (504) and the full view (504"). In other words, targeted applications can include banner images such that the targeted application shown in the primary application is a slice of a larger image that is seamlessly revealed when selected. This full screen targeted application provides the full interactive content of the targeted application.

In some aspects of the technology, the targeted application either advertises products for purchase or links to an online store to purchase products. In such aspects of the technology, it is undesirable to have the user navigate away from the application because such additional steps reduce the likelihood that a sale will be converted. Accordingly, the present technology provides for allowing a user to purchase products outside of the targeted application, while maintaining the appearance that the user is still operating within the targeted application.

Figure 6:
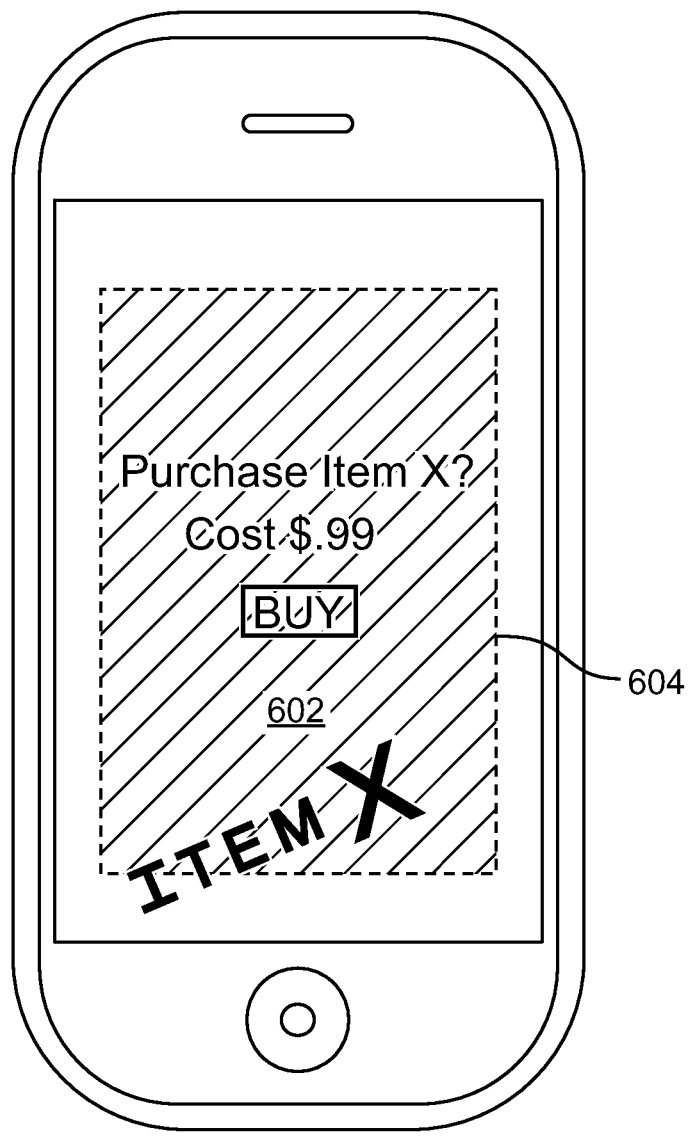
FIG. 6 illustrates a point-of-sale embodiment without navigating away from the targeted application.

FIG. 6 illustrates an exemplary user interface for allowing a user to purchase a product outside of the targeted application while the user experience maintains the appearance of being within the targeted application. As illustrated, the targeted application (602) is advertising ITEM X (a hypothetical item for purchase), which the user has selected to purchase. A purchase interface (604) is further shown overlaid the targeted application. In some embodiments, the purchase interface (604) is translucent or has transparent portions so that the targeted application (602) remains at least partially visible through the purchase interface. While the purchase interface (604) looks like it is part of the targeted application (602), it is really an extension of an online store. As an example, ITEM X could be a media item such as a movie or music, which is available for purchase from an online store, such as ITUNES, by Apple Inc., of Cupertino, Calif. In such an example, the targeted application could be a game or video or advertisement relating to the media item. The media item is not sold by the targeted application; it is sold by the online media store. Accordingly, the purchase interface is an extension of the online store and can be used to allow the user to purchase the media item from the store. To the user, it as though they bought the media item from the targeted application.

Figure 7:
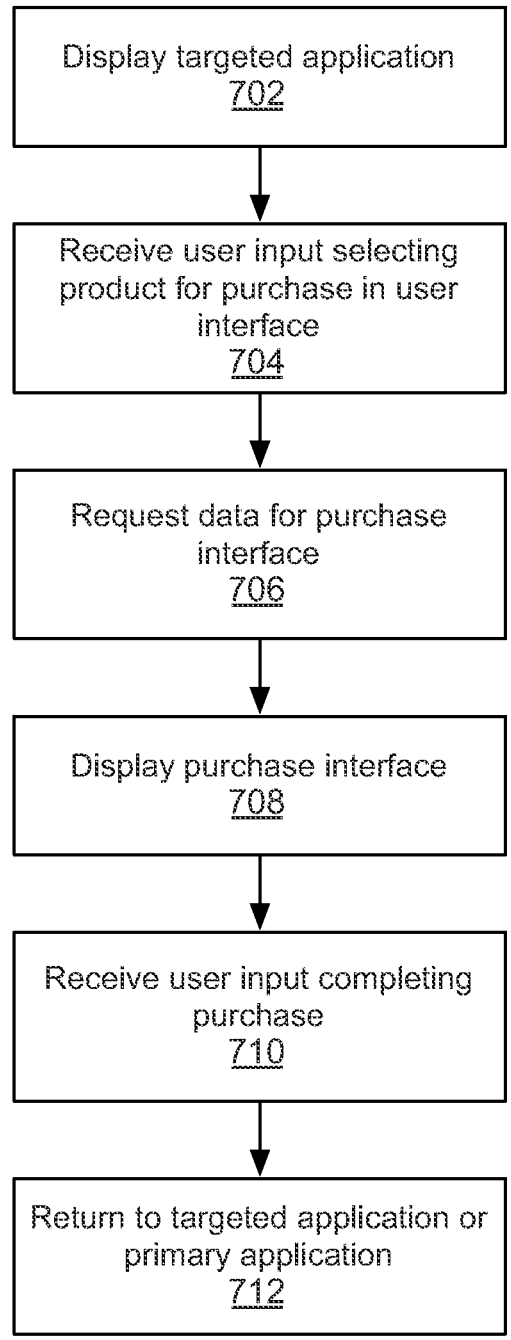
FIG. 7 is a flowchart illustrating a method embodiment for completing the sale of a product without navigating away from the targeted application.

FIG. 7 illustrates an exemplary method for providing a point of purchase that appears to be within the targeted application. The targeted application is displayed on the device and it advertises a product for sale (702). If a user wishes to purchase the item, the user can select the product for purchase using an input device and the input is detected by the system (704). Responsive to the received user input, the system can request data needed to provide a purchase interface (706). In some embodiments, the data needed to provide the purchase interface includes data representing the entire purchase interface, while in some embodiments it includes data representing information used to fill out fields in a template purchase interface.

Whether a template purchase interface is used with data from the store, or a purchase interface sent by the store is used, the purchase interface is displayed overlaid the targeted application (708). As addressed above, in some embodiments, the purchase interface is displayed as a substantially translucent or transparent interface so that at least portions of the targeted application can be seen through the purchase interface.

Receiving user inputs effective to complete the purchase completes the purchase (710). Responsive to those inputs, the system can communicate the confirmed purchase with the online store. The purchase interface can be removed and the user is returned to the targeted application or the primary application (712).

The targeted application can be a program, applet, image, object with hyperlinks, html application, video, flash object, etc. It can be for any purpose including, gaming, video, web interaction, advertising, document preparation, presenting, etc.

In some embodiments, the targeted application is an HTML5 web application for the purpose of advertising. In such embodiments, the primary application can call the operating system requesting an advertisement to be displayed in the view reserved for that purpose in the primary application. The operating system can use a daemon to collect advertisement targeting information that can be sent to an advertising server which can select and serve an advertisement that is best suited for display to the specific user in that primary application.

The device can download initial banner views of the advertisement suitable for display in any display orientation, which the primary application is expected to run. For example, the primary application might be expected to run in a portrait and a landscape orientation and, accordingly, the device will download the advertisement banners to be initially displayed.

The banners for portrait and landscape orientation can be standard sizes, which, in some embodiments, should not take up more than ten percent of the display area. When the orientation of the device changes from portrait to landscape or landscape to portrait, the banner corresponding to the orientation will be loaded and displayed.

The device can thereafter download the HTML5 version of the advertisement that contains interactive features to enrich the user's experience with the advertisement. Additionally, the device can preload a web archive of additional content associated with the ad so that the advertisement can present its full functional advertisement content without waiting for the additional content to be downloaded. However, it may be necessary or desired to download some content upon request.

In some embodiments, the banner, which is initially displayed, is actually only a small portion of the full targeted-advertisement application. When a user selects the banner, the full advertisement can be displayed. In such embodiments, an animation can show the banner portion of the targeted-advertisement application grow into the full advertisement, or the animation can show the primary application being pulled back to reveal the full ad. Other animations are possible. It is also possible that the banner is just a link to the full targeted-advertisement application, which can be loaded upon selection of the banner.

The full targeted-advertisement application can have a variety of interactive functions. The advertisement can present a game, information, or any other desired content. The advertisement can also provide a point of purchase for one or more advertised items. While it will most commonly be the case that the advertisement is providing a link to an online store that is the entity actually selling the advertised items, to the user, it looks as if the advertisement is the entity selling the item because the user will not have to leave the advertisement to complete the purchase.

When a user desires to purchase an advertised product, the user can select the product from the advertisement. The advertisement can request information to complete a purchase interface, or can request a purchase interface directly from the store. The purchase interface can be displayed directly in, or above, the advertisement program and thus the purchase is completed without navigating away from the advertisement program.

The present technology also protects the operating system and the primary application from unstable and malicious targeted applications by running the targeted application as a separate process. In some embodiments, the targeted application is run in a virtual machine type environment or given access to limited resources. In some embodiments, the targeted application is run in a sandbox so that it cannot effect the primary application or operating system. Running the targeted application in a sandboxed environment allows the targeted application to crash or freeze and be quit without effecting the primary application. It also prevents the targeted application from including malicious content or extracting data from the primary application.

Figure 8:
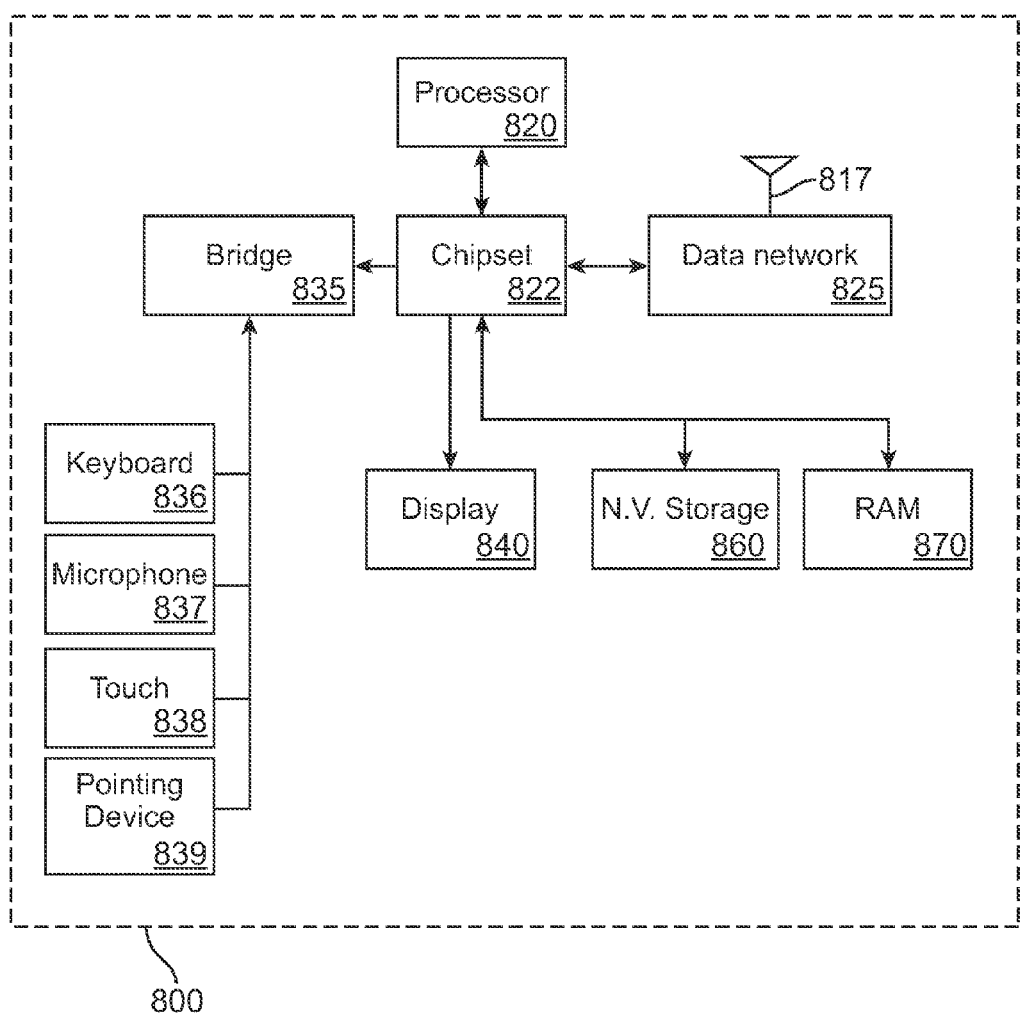
FIG. 8 is a schematic illustration of an exemplary system embodiment.

FIG. 8 illustrates a computer system 800 used in executing the described method. Computer system 800 is an example of computer hardware, software, and firmware that can be used to implement disclosures above. System 800 includes a processor 820, representative of any number of physically and/or logically distinct resources capable of executing software, firmware, and hardware configured to perform identified computations. Processor 820 communicates with a chipset 822 that can control input to and output from processor 820. In this example, chipset 822 outputs information to display 840 and can read and write information to non-volatile storage 860, which can include magnetic media and solid-state media, for example. Chipset 822 also can read data from and write data to RAM 870. A bridge 835 for interfacing with a variety of user interface components can be provided for interfacing with chipset 822. Such user interface components can include a keyboard 836, a microphone 837, touch detection and processing circuitry 838, a pointing device, such as a mouse 839, and so on. In general, inputs to system 800 can come from any of a variety of sources, machine-generated and/or human-generated.

Chipset 822 also can interface with one or more data network interfaces 825 that can have different physical interfaces 817. Such data network interfaces can include interfaces for wired and wireless local area networks, for broadband wireless networks, as well as personal area networks. Some applications of the methods for collecting data in the location-popularity index and ranking and returning location search results disclosed herein can include receiving data over physical interface 817 or be generated by the machine itself by processor 820 analyzing data stored in memory 860 or 870. Further, the machine can receive inputs from a user via devices 836, 837, 838, 839 and execute appropriate functions, such as browsing functions, by interpreting these inputs using processor 820.

Methods according to the above-described examples can be implemented using computer-executable instructions that are stored or otherwise available from computer-readable media. Such instructions comprise, for example, instructions and data which cause or otherwise configure a general purpose computer, special purpose computer, or special-purpose processing device to perform a certain function or group of functions. Portions of computer resources used can be accessible over a network. The computer executable instructions may be, for example, binaries, intermediate-format instructions such as assembly language, firmware, or source code, including transitory signals carrying the instructions. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware, and/or software, and can take any of a variety of form factors. Typical examples of such form factors include laptops, smart phones, small form factor personal computers, personal digital assistants, and so on. Functionality described herein also can be embodied in peripherals or add-in cards. Such functionality also can be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further, and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method comprising:
receiving at a daemon a request for a targeted application to be displayed within a view in a primary application, the daemon being a background process in an operating system executing on a device, wherein the request is received from the primary application executing on the device;
collecting at the daemon targeting data, the targeting data comprising device and
operating system data that the primary application is prohibited from accessing; sending by the daemon the targeting data to an application server;
receiving the targeted application from the application server, the targeted application being selected by the application server based on an analysis of the targeting data; and
presenting the targeted application within the view in the primary application.

2. The method of claim 1, wherein the targeted application is stored in a cache specific to the primary application.

3. The method of claim 2, wherein the targeted application stored in the cache has one or more associated restrictions limiting when the targeted application stored in the cache can be displayed.

4. The method of claim 3, wherein the primary application can present the targeted application directly from the cache provided that presenting the targeted application will not exceed the associated restrictions.

5. The method of claim 1, wherein the targeted application received from the server can be multiple targeted applications being selected by the application server based on an analysis of the targeting data.

6. The method of claim 1, further comprising:
downloading the targeted application from the application server.

7. The method of claim 6, wherein a banner image having the same appearance as the targeted application is initially downloaded and displayed.

8. The method of claim 7, wherein the application is downloaded after the banner image, and once downloaded is presented in place of the banner image.

9. The method of claim 1, wherein the targeted application is an interactive application.

10. The method of claim 1, wherein the targeted application is executed in a software sandbox.

11. A product comprising:
a non-transitory machine-readable medium; and
machine-executable instructions stored on the machine-readable medium for causing a computer to perform the method comprising:
receiving at a daemon a request for a targeted application to be displayed within a view in og a primary application, the daemon being a background process in an operating system executing on a device, wherein the request is received from the primary application executing on the device;
collecting at the daemon targeting data, the targeting data comprising data describing user preferences, network information, location information, and information identifying the primary application;
sending by the daemon the targeting data to an application server; downloading one or more targeted applications from the application server, the targeted application(s) being selected by the application server based on an analysis of the targeting data; and
presenting the first targeted application received within the view in ot~ the primary application.

12. The product of claim 11, wherein the daemon is a proxy for the application server.

13. The product of claim 12, wherein the targeted application(s) is stored in a system-wide cache.

14. The product of claim 13, wherein the daemon selects a targeted application for presentation by the primary application from the system-wide cache.

15. The product of claim 11, wherein the proxy receives metadata describing the targeted application(s) from the application server and forwards the metadata to the primary application which downloads the one or more targeted applications from the application server.

16. The product of claim 11, wherein a banner image having the same appearance as the targeted application is initially downloaded and displayed.

17. The product of claim 16, wherein the application is downloaded after the banner image, and once downloaded is presented in place of the banner image.

18. The product of claim 11, wherein the targeted application is an interactive application.

19. A system for presentation of targeted content on a handheld communication device comprising:
a processor configured to execute a daemon to collect requests for a targeted application and targeting data, the daemon being a background process in an operating system executing on a device, wherein the request is received from the primary application executing on the device;
a communications interface configured to send the request for the targeted application and send the targeted data to an applications server, and to download a targeted application from the applications server;
the applications server configured to receive the request for the targeted application, and to determine a targeted application based on the targeting data, and to return the determined targeted application to the communications interface; and
the processor further configured to display the targeted application within a primary application.

20. The system of claim 19, wherein the applications server is configured to return an image appearing to be the targeted application prior to returning the complete targeted application.

21. The system of claim 20, wherein the processor displays the image appearing to be the targeted application until the complete targeted application is downloaded.

22. The system of claim 19, further comprising:
a cache configured to store the downloaded targeted application.

23. The system of claim 19, wherein the processor runs the targeted application in a sandbox.

* * * * *